C. H. WHITCHER.
THREAD CONTROLLED STOP MOTION MECHANISM.
APPLICATION FILED JULY 8, 1909.
Reissued Aug. 31, 1909.
13,018.
2 SHEETS—SHEET 1.
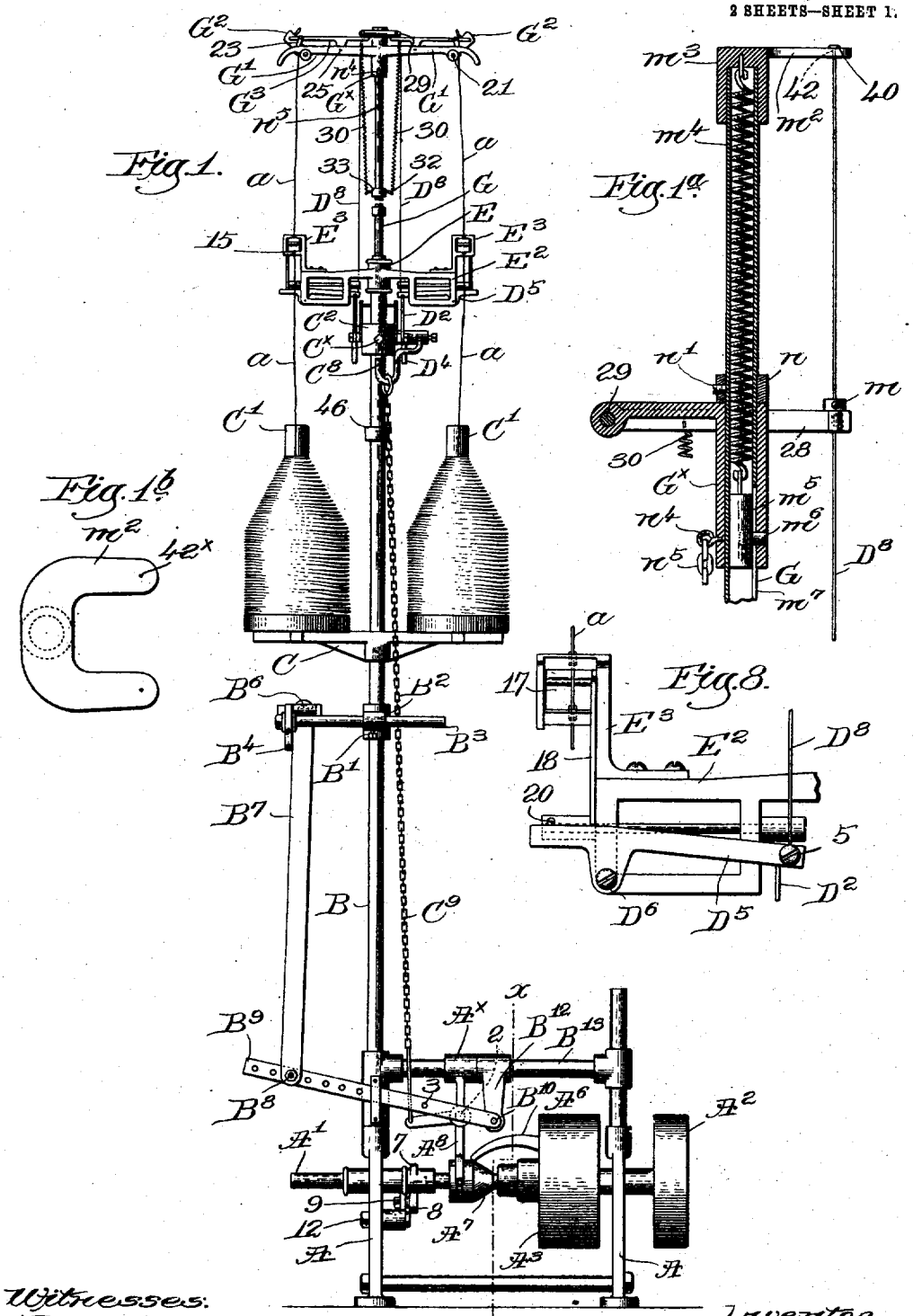
Witnesses:
Thomas J. Drummond.
Joseph M. Ward.
Inventor.
Charles H. Whitcher,
by Bailey Fenwy. Attys.
ANDREW B. GRAHAM CO., PHOTO-LITHOGRAPHERS, WASHINGTON, D. C.

C. H. WHITCHER.
THREAD CONTROLLED STOP MOTION MECHANISM.
APPLICATION FILED JULY 8, 1909.
Reissued Aug. 31, 1909.
13,018.
2 SHEETS—SHEET 2.
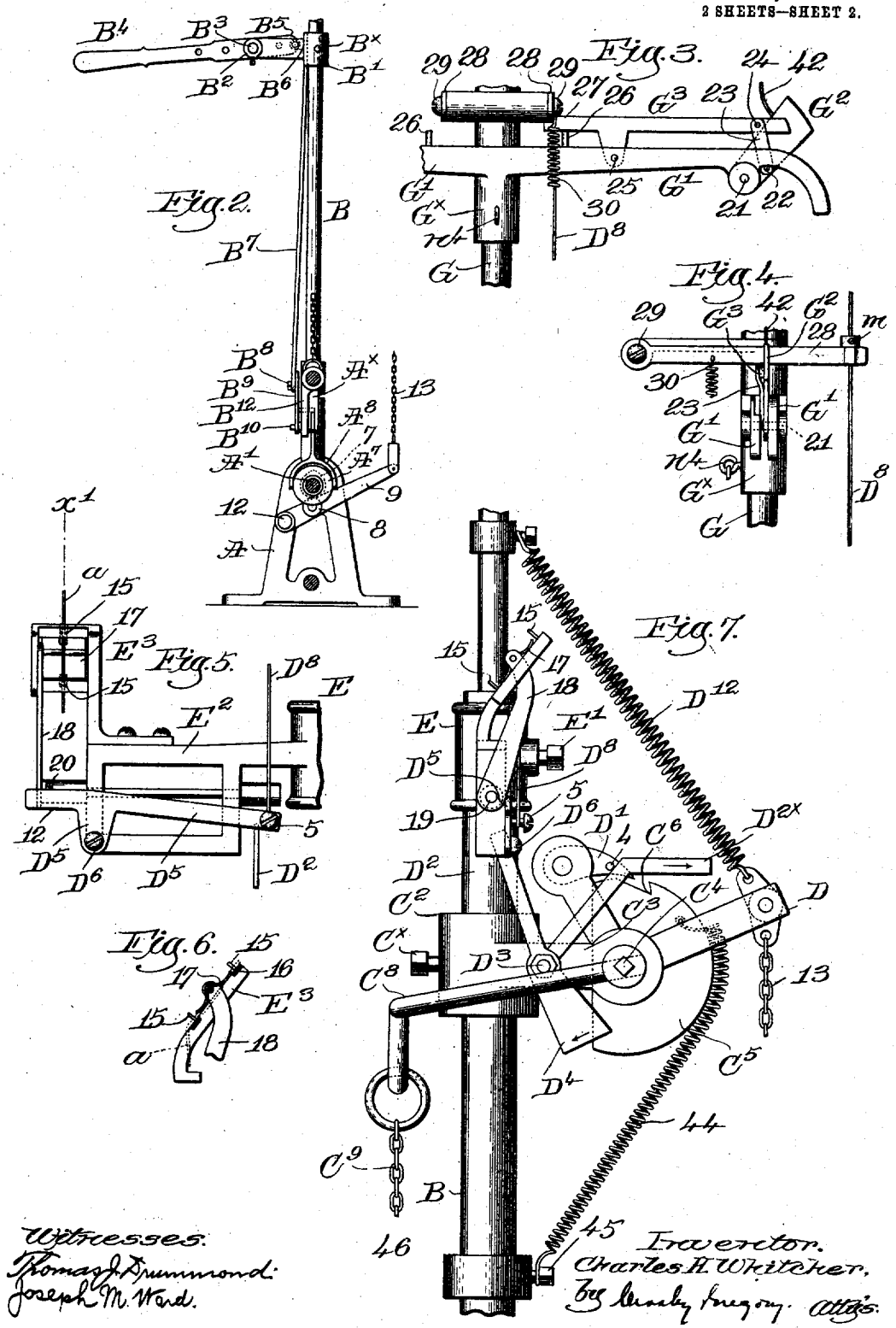
Witnesses:
Thomas J. Drummond.
Joseph M. Ward.
Inventor.
Charles H. Whitcher.
by Bentley Fenwick Atty's.
ANDREW, F. GRAHAM CO., PHOTO-LITHOGRAPHERS, WASHINGTON, D. C.

UNITED STATES PATENT OFFICE.

CHARLES H. WHITCHER, OF FRANKLIN, NEW HAMPSHIRE.

THREAD-CONTROLLED STOP-MOTION MECHANISM.

13,018. Specification of Reissued Letters Patent. Reissued Aug. 31, 1909.

Original No. 918,803, dated April 20, 1909, Serial No. 358,393. Application for reissue filed July 8, 1909. Serial No. 506,640.

*To all whom it may concern:*

Be it known that I, CHARLES H. WHITCHER, a resident of Franklin, county of Merrimack, State of New Hampshire, and formerly of Lakeport, county of Belknap, State of New Hampshire, have invented an Improvement in Thread-Controlled Stop-Motion Mechanism, of which the following description, in connection with the accompanying drawing, is a specification, like characters on the drawing representing like parts.

This invention resides in a stop motion device or mechanism self-contained in structure and adapted for use in connection with a thread-using machine. It is particularly adapted and designed for use in connection with a knitting machine to which thread is supplied from suitable bobbins or spools. By the use of the term "thread" I intend to cover any form of yarn, thread or similar material adapted for use in knitting or other machines.

The important feature of the invention resides in the independent and self-contained character of the stop motion mechanism whereby it may be used in connection with any thread-using machine and may be changed from one machine to another as desired. For example, in the case of knitting machines, it is frequently desirable to change from one size of cam cylinder to another to allow of the knitting of different sizes of goods. The construction of the present invention being entirely independent of the thread-using machine, any such change can be made without in any way affecting its operation or requiring the removal and replacement and re-adjustment of parts of the stop motion mechanism. Furthermore, by reason of its self-contained and independent construction the present invention is adapted for use with any and all kinds of machines and may be changed from one kind of machine to another, and is thus adapted for use with all kinds of old machines as well as new.

Another important feature of the invention resides in the fact that the mechanism for causing the stopping of the machine is positively operated so that the stopping action is always positive, sure and accurate.

Another important feature of the invention resides in the embodiment of a clutching mechanism in this stop motion mechanism, thus enabling the stop motion mechanism to be used in connection with high-speed machines, such as seamless knitting machines which require a belt shifter. To operate a belt shifter for stopping the machine is impractical in connection with high-speed machines because it cannot be operated quickly enough and when operated requires the use of brakes which jar and injure the machine.

Another feature of the invention resides in a carriage for the thread-guides of a stop motion mechanism whereby they can be moved into reach of the attendant when threading up the mechanism after stopping.

Another feature of the invention resides in the construction of the actuator sustained by the thread and its coöperative parts whereby all danger from its non-operation by becoming clogged or entangled with the thread or yarn fibers is avoided.

The features above enumerated and others will appear from the accompanying specification and drawings, and will be more particularly pointed out in the appended claims.

The drawings show the preferred form of an apparatus embodying the invention designed for setting up on the floor adjacent to the thread-using machine.

Figure 1 of the drawing in elevation represents a machine embodying my invention. Fig. $1^a$ shows part of the apparatus of my invention broken off of Fig. 1. Fig. $1^b$ a top view of the plate $m^2$. Fig. 2 is a detail at the left of the section line $x$. Fig. 3 an enlarged detail of the part of the mechanism for stopping the machine on occurrence of bunches or knots in the thread. Fig. 4 is a detail looking at the parts shown in Fig. 3 from the right. Fig. 5 is an enlarged detail showing part of the means for stopping the machine when the thread breaks. Fig. 6 is a section in the line $x'$, Fig. 5. Fig. 7 is an enlarged detail looking at the central part of the machine from the right, Fig. 1, and Fig. 8 is a modification.

Referring to the drawings, A represents part of the base or framework of a machine, embodying the invention and adapted to be supported from the floor or support for a thread-using machine, such as a knitting machine.

As already pointed out, the machine of this invention is self-contained and independent and may be located adjacent to any form of thread-using machine with which it is desired to operate.

In the preferred form of mechanism illustrated the base sustains bearings for a shaft A′ having a fast pulley $A^2$ driven constantly and constituting a driving element, said shaft having splined thereon a cone $A^7$ grooved circumferentially to be engaged by suitable pins in the forked end of a cone sliding lever $A^8$ mounted on a stud 2 held in a depending arm $A^x$. The shaft A′ is provided with a driven element herein shown as a loose clutch pulley $A^3$ that drives a belt for actuating the knitting or other machine to which the threads or yarns, *a*, *a* are fed, said pulley being adapted to be connected to said shaft to drive a knitting or other machine when the clutch closing lever $A^6$ under the control of the cone $A^7$, is moved, as will be described. I have not shown fully the construction of the clutch pulley as any usual form of clutch pulley having a lever $A^6$ may be used without departing from my invention.

Rising from the base A is a rod B on which is adjustably mounted by a set screw $B^x$ a collar B′ having an extended arm provided with a boss $B^2$ that receives a rod $B^3$ constituting the fulcrum for a starting lever $B^4$, shown as connected at its inner end at $B^5$, Fig. 2, with a projection $B^6$ attached to the upper end of a link $B^7$, in turn adjustably connected by bolt $B^8$, with a radius bar $B^9$ having its fulcrum on a stud $B^{10}$ carried by a depending arm $B^{12}$ mounted on a rod $B^{13}$ forming part of the base or frame work A, said radius bar being provided with a pin 3 as shown. When the outer end of lever $B^4$ is depressed, it acts through the connections described to depress the bar $B^9$ so that its pin 3 meets the cone sliding lever $A^8$ and moves the cone to the right, Fig. 1, to start the machine, which done the lever $B^4$ is released and is moved by gravity into its normal inoperative position Fig. 2. Above the collar B′ the stand has connected therewith a bobbin or spool-carrier C, adapted to sustain a plurality of thread-supplying means herein shown as two bobbins C′, each supplied with thread or yarn *a*. The rod B higher up sustains a collar $C^2$ from which is extended an arm $C^3$ that constitutes a bearing for a rock shaft $C^4$ having an arm $C^8$ united by a flexible connection $C^9$ with the cone sliding lever $A^8$. The rock-shaft $C^4$ is provided with a plurality of disks $C^5$ each provided with a notch $C^6$, there being as many of these disks as there are thread-supplying means and each disk being rigidly connected with the rock-shaft $C^4$.

The rock shaft $C^4$ has loosely mounted thereon pawl-carriers D each provided with a pawl D′ having a pin 4 that contacts normally with an arm $D^{2x}$ of a controller one of which is provided for each pawl and is herein shown as a three-armed lever mounted on a stud $D^3$ extended from the projection $C^3$, the lower arm $D^4$ of said lever being weighted that it may act when free to move said controller or lever in the direction of the arrows shown thereon to allow the pawl D′ to drop into operative engagement with the notch $C^6$ of its corresponding disk $C^5$.

The shaft A′ has an attached cam 7 that strikes a roller stud 8, see Fig. 2, of a lever 9 pivoted at 12 and united by a connection 13, shown as a chain, with the carrier D for the pawls D′ so that said pawl carrier is moved constantly, a spring $D^{12}$ connected with said pawl-carrier acting normally to keep the roller 8 in contact with its actuating cam.

A spring 44 connected at one end to the upright B by means of a collar 46 and set-screw 45, and at the other end to the disks $C^5$, serves as a counterbalance against the weight of the arm $C^8$, connector chain $C^9$, and other parts. The disks $C^5$ are returned to normal position after they have been moved by the operation of the pawls D′ by the movement of the shipper lever $B^4$ which, through the intermediate parts described, will exert a downward pull on the connector chain $C^9$, and thus move the disks $C^5$ back to the position from which they were moved by the operation of the pawls D′.

Above the collar $C^2$ the rod or upright B has mounted thereon by a set-screw E′ a hub E provided with a plurality of radially-extended arms $E^2$, one corresponding with each thread and sustaining in each case a lever or main releasing device $D^5$.

The upper end of a given controller or lever $D^2$ is acted upon and held normally by the end of a main releasing device $D^5$ under control of the thread or yarn *a*, to be further described, and mounted on a stud $D^6$ of an arm $E^2$, the said end of said lever having a stud 5 with which is connected a link $D^8$ which when raised, by fault in the thread or yarn, as will be described, releases the lever $D^2$ that it may turn to the right Fig. 7, due to the weight $D^4$, and let the pawl D′ drop and engage the notch $C^6$ of disk $C^5$ moving said disk, shaft, arm $C^8$ and connector $C^9$ to turn the cone sliding lever and slide the cone $A^7$ to the left from its position Fig. 1, release the lever $A^6$ and stop further rotation of pulley $A^3$ and the parts to be driven thereby.

As shown in Figs. 1 and 5, each arm $E^2$ has erected upon it a thread or yarn guiding stand $E^3$ provided as shown in Figs. 5 and 6, with pins 15 between which the yarn passes and is guided on its way to the devices of the thread-using machine such as the usual needles of a knitting machine, said pins being shown as rising from bars 16 that sustain the thread or yarn on its way through the apparatus. Between these bars 16 the thread or yarn is acted upon by and sustains the foot 17 of the main actuator of the stop motion mechanism to be herein claimed, said main actuator being represented as a lever 18 mounted on a stud 19, the lever having preferably a finger or projection 20 that coacts with the short end of the releasing device $D^5$, said main actuator being normally held when the thread is unbroken in a position to retain the said releasing device $D^5$ in the full line position Figs. 5, 6 and 7. The construction of this thread-guiding device and actuator is an important feature of the device and is illustrated more fully in detail in Fig. 6. The bars 16 carrying the thread-guiding pins 15 are separated from each other a sufficient distance so that the fibers of the thread or yarn as they are rubbed off will not become entangled with these bars and the end of the main actuator so as to prevent its operation. With the ordinary form of thread-guiding devices in which the parts are slightly separated, the fibers gradually collect upon and wrap around these parts and thus fasten them together and prevent their separation when the thread or yarn breaks. The distance between the bars 16 will be governed by the length of fibers of the yarn, but in practice if spaced apart an inch and a half, they will prevent trouble from the source indicated by most any form of yarn. This construction renders necessary the foot 17 hereinbefore referred to which, as illustrated, consists of a flat piece pivoted at the end of the main actuator 18 and extending nearly the entire distance between the bars 16. One end of the foot, herein shown as the upper end, is arranged to bear upon one bar 16 and is provided with a thread-guiding notch shown in Fig. 5 which prevents the thread from being pinched between the bar and the foot, while the other end swings clear of the opposite bar. It will thus be seen that as the thread travels over the bars 16 and under the foot, the foot is supported thereupon and prevented from falling by any immaterial strain and until the thread breaks or is released when the foot will turn on its pivot being rocked against the bar 16 and allow the actuator 18 to fall.

Above the hub E the rod B sustains a tube G that serves as a guide for a vertically movable carriage $G^\times$ having oppositely extended arms $G'$ one for each thread supply and each having a stud 21 on which is pivoted a crank arm $G^2$ provided with thread-guiding arm 42, said crank arm having a pin 22 that engages the lower end of a link 23 jointed at 24 to an auxiliary actuator shown as a lever $G^3$ pivoted at 25 on the arm $G'$. The arm $G'$ has a stop 26 against which the short arm 27 of said auxiliary actuator is normally maintained by a lever 28 free to turn on a stud screw 29, each lever 28 having a connected spring 30, the free ends of said levers 28 receiving in holes thereon the links $D^8$ before described, the lower ends of the springs 30 being attached to studs 32 of a collar 33 secured to the tube G. The links $D^8$ above the holes in the free ends of the lever 28 have fastened to them a collar $m$ shown in Fig. $1^a$, said figure showing part of the thread-sustaining mechanism broken off the top of Fig. 1, and also showing the carriage in its depressed position for allowing the re-threading of the thread-guide.

The upper end of each link $D^8$ is secured to a fork or plate $m^2$ secured to a collar $m^3$ secured to the upper end of the tube G, said fork or plate having connected therewith the upper end of a spring $m^4$ contained in said tube and connected at its lower end with a plug $m^5$ having extended therefrom a stud $m^6$ through a slot $m^7$ in said tube, said stud entering a hole in the carriage $G^\times$. The spring $m^4$ acts normally to lift the carriage $G^\times$ and retain its upper end seated yieldingly against the underside of said collar. The carriage as shown has a screw eye $n^4$, with which is attached a chain $n^5$ of such length as to be easily grasped by the hand of the shortest person to attend the machine.

Whenever a thread breaks and the machine is stopped automatically, the thread has, it will be understood, to be again introduced under the foot 17 and laid on the arm $G^2$, and this is difficult to do if the attendant of the knitting machine is short of stature. To enable the threads to be reapplied the operator may engage the chain, pull down the carriage $G^\times$ and with it the parts $G'$, $G^2$, $G^3$, which parts are fully shown in Fig. 1, but omitted from Fig. $1^a$ to simplify the drawing. The upper end of each stiff or wire link $D^8$ is headed at 40, as shown in Fig. $1^a$, after having been inserted through a slot $42^\times$ in the plate $m^2$.

In operation the threads $a$ delivered from the bobbins $C'$, $C'$, pass under the feet 17 of the main actuator of the stop motion device, and said device is held in its abnormal inoperative position, as shown in the drawings, the thread passing under said foot between the pins or guides 15. The threads then pass upwardly and are laid on the crank arm $G^2$ at one side of the guide wire 42 extended therefrom. Now in case the thread breaks, the foot 17 of the main actuator being no longer supported by the thread, the lever 18 will turn to the right from its position Fig. 7 and acting upon the short arm of the main releasing device $D^5$ will turn said device about its pivot $D^6$ causing the long arm of said lever to rise and free the pawl-controller $D^2$ that the pawl $D'$ may engage and turn disk $C^5$ and move the cone to the left Fig. 1 and stop the pulley $A^3$.

It will be noted that when the controller or lever $D^2$ is released by the thread through the intermediate agencies described and the pawl allowed to drop into engagement with the disk, that the operation of the clutch is then caused positively and accurately. No springs or other inaccurate devices intervene in this mechanism. The pawl D′ is positively driven from the driving shaft A′ of the apparatus and acts in turn to operate positively the clutch $A^7$.

It will be understood while the machine is running properly, that the stud 4 of the pawl D′ will ride upwardly on the inclined part of the controller $D^2$ and slide back and forth on the horizontal part thereof without the end of the pawl meeting the notch in the disk $C^5$. The spring 44 serves as a sort of a check to prevent the disk $C^5$ following backwardly at the same speed as the pawl D′ as the latter is moved backwardly or to the left Fig. 7. In case a knot or bunch occurs in the threads which would injure the needles, the machine must be stopped, and to do this the bunch will contact with and be arrested by the pins 15, and the strain so put on the thread or yarn will exert sufficient strain on the crank arm $G^2$ to turn said arm about its pivot 21, causing the link 23 acting on the auxiliary actuator $G^3$ to cause its short arm to be raised to lift the free end of the lever 28 and connection $D^8$ before described, which movement will immediately move the main releasing device, releasing the controller $D^2$ as before described, and stopping the pulley $A^3$.

The crank arm $G^2$ with the pin 42 forms a large-sized thread-guide of such size that the thread in running during the operation of the machine will not jump or spring out owing to kinks or inequalities, and at the same time the movement of the parts under the strain or tension caused by a knot or bunch catching in the pins 15 is such that the thread easily passes out from the thread-guide over the curved end of the arm G′.

The construction of the parts of this mechanism is such as to be very sensitive to the tension on the thread. The inclination of the crank-arm $G^2$ and its connection with the auxiliary actuator lever $G^3$ by means of the link 23, presents a construction where the pull on the thread in passing through the thread-guide acts upon any slight increase to rock the auxiliary actuator lever. The degree of tension required to rock the parts is regulated with great exactness by means of the stop 26 which can be set at any desired height, and by the strength of the spring 30, which should be sufficient to hold the auxiliary actuator lever $G^3$ against the stop in opposition to the weight of the crank-arm $G^2$ and connected parts, together with the desired tension on the thread at which the parts shall move. This construction does away with any dead pull over the thread-guide and permits the use of soft spun yarns, and in a knitting machine prevents tightening of the loops on the needles and consequent injury to the fabric. It will thus be seen that the stop motion mechanism will be operated by or through the occurrence of a fault in the thread such as the breaking of the thread or the occurrence of a knot or bunch in the thread. In each instance the clutch pulley is released through the positive connections from the lever $D^5$ to the clutch.

When the stop motion mechanism has been operated to unclutch the driven element $A^3$, the thread-using machine which is driven by this element will, of course, be stopped at once. When the thread has been replaced the mechanism is started by clutching the driven element through the operation of the hand lever $B^4$. It will be noted that this lever for operating the clutch is a part of the independent self-contained mechanism constituting this invention. The thread-using machine itself may be provided as usual with a starting and stopping lever or shipper for starting and stopping the machine independently of the breaking or failure of the thread. The mechanism of the present invention is concerned only with the stopping of the machine upon the breaking or failure of the thread and the starting of the machine after the repair or replacement of the thread.

In the construction illustrated as a preferred embodiment of the invention it will be noted that all the various mechanisms above the base are supported from collars adjustably mounted on the upright or rod B. This enables the entire device to be altered to suit the particular conditions, such as variations in the length of bobbins or cones of thread, the height of the particular machine with which it is to be used, the speed at which the machine with which it is to be used is run, and other conditions which may occur.

Having described my invention, what I claim as new and desire to secure by Letters Patent is:—

1. A self-contained stop motion mechanism for use in connection with a thread-using machine, comprising a base, a driving element and a driven element mounted on said base, the said driven element being adapted to drive said thread-using machine, clutching means for connecting and disconnecting said driving and driven elements, and means rendered operative by or through the occurrence of a fault in the thread to cause the disconnecting of said clutching means.

2. A self-contained stop motion mechanism for use in connection with a thread-using machine, comprising a base, a driving element and a driven element mounted on said base, the said driven element being adapted to drive said thread-using machine, clutching means for connecting and disconnecting said driving and driven elements, means rendered operative by or through the occurrence of a fault in the thread to cause the disconnecting of said clutching means, and manually-operated means to cause the connecting of said clutching means.

3. A self-contained stop motion mechanism for use in connection with a thread-using machine, comprising a base, a driving element and a driven element mounted on said base, the said driven element being adapted to drive said thread-using machine, clutching means for connecting and disconnecting said driving and driven elements, and means positively actuated by said driving element and rendered operative by or through the occurrence of a fault in the thread to cause the disconnecting of said clutching means.

4. A self-contained stop motion mechanism for use in connection with a thread-using machine, comprising a base, a driving element and a driven element mounted on said base, the said driven element being adapted to drive said thread-using machine, clutching means for connecting and disconnecting said driving and driven elements, means positively actuated by said driving element and rendered operative by or through the occurrence of a fault in the thread to cause the disconnecting of said clutching means, and manually-operated means to cause the connecting of said clutching means.

5. A self-contained stop motion mechanism for use in connection with a thread-using machine, comprising a base, a driving element and a driven element mounted on said base, the said driven element being adapted to drive said thread-using machine, clutching means for connecting and disconnecting said driving and driven elements, a plurality of thread supplies mounted on said base, a plurality of means one for each thread supply and each rendered operative by or through the occurrence of a fault in its thread to cause the disconnecting of said clutching means.

6. A self-contained stop-motion mechanism for use in connection with a thread-using machine, comprising a base, a driving element and a driven element mounted on said base, the said driven element being adapted to drive said thread-using machine, clutching means for connecting and disconnecting said driving and driven elements, a plurality of thread supplies mounted on said base, a plurality of means one for each thread supply and each positively actuated by said driving element and each rendered operative by or through the occurrence of a fault in its thread to cause the disconnecting of said clutching means.

7. A self-contained stop motion mechanism for use in connection with a thread-using machine, comprising a base, a driving element and a driven element mounted on said base, the said driven element being adapted to drive said thread-using machine, clutching means for connecting and disconnecting said driving and driven elements, positively actuated means for causing the disconnecting of said clutching means, a plurality of thread supplies mounted on said base, and a plurality of thread-guiding devices mounted on said base, one for each thread, and acting by or through the breaking of the thread to render operative said positively-actuated means.

8. A self-contained stop motion mechanism for use in connection with a thread-using machine, comprising a base, a driving element and a driven element mounted on said base, the said driven element being adapted to drive said thread-using machine, clutching means for connecting and disconnecting said driving and driven elements, positively-actuated means for causing the disconnecting of said clutching means, a plurality of thread supplies mounted on said base, a plurality of thread-guiding devices mounted on said base, one for each thread, and acting by or through the breaking of the thread to render operative said positively-actuated means, and a plurality of auxiliary thread-guiding devices mounted on said base and acting upon the occurrence of a knot or bunch in the thread to render operative said positively-actuated means.

9. A thread-controlled stop motion mechanism comprising means for stopping the operation of a driven element, a thread-guiding stand provided with two thread-guiding supports widely separated to prevent the thread fibers extending therebetween, an actuator arm provided with a wide thread supported foot pivoted at the end thereof and adapted to rest on one of said supports and to swing clear of the other, and means rendered operative by the movement of said actuator arm upon its release by the failure of the thread to actuate said stopping means.

10. A thread-controlled stop motion mechanism comprising means for stopping the operation of a driven element, a thread-guiding stand provided with two thread-guiding supports widely separated to prevent the thread fibers extending therebetween, an actuator arm provided with a wide thread supported foot pivoted at the end thereof and adapted to rest on one of said supports and to swing clear of the other, the edge of the foot resting upon the support being provided with a thread-guiding notch, and means rendered operative by the movement of said actuator arm upon its release by the failure of the thread to actuate said stopping means.

11. A thread-controlled stop motion mechanism, comprising two thread-guiding supports widely separated to prevent the thread fibers extending therebetween and an actuator arm provided with a wide thread supported foot pivoted at the end thereof and adapted to rest on one of said supports and to swing clear of the other whereby upon the failure of the thread the actuator arm is released.

12. A thread - controlled stop motion mechanism, comprising two thread-guiding supports widely separated to prevent the thread fibers extending therebetween and an actuator arm provided with a wide thread supported foot pivoted at the end thereof and adapted to rest on one of said supports and to swing clear of the other, the edge of the foot resting upon the support being provided with a thread-guiding notch.

13. A thread - controlled stop motion mechanism, comprising a base, an upright from said base, a carriage mounted to slide upon said upright, a plurality of arms extending from said carriage, a thread guide pivotally mounted on each arm and provided with a wide open mouth, a lever pivoted on each arm and connected with each thread guide and adapted to be rocked by said thread guide upon the occurrence of an abnormal tension on the thread, means rendered operative by the movement of said lever to actuate the stopping mechanism.

14. A thread - controlled stop motion mechanism, comprising a base, an upright from said base, a carriage mounted to slide upon said upright, a spring for holding said carriage in its normal raised position, a plurality of arms extending from said carriage, a thread-guide pivotally mounted on each arm and provided with a wide open mouth, a lever pivoted on each arm and connected with each thread guide and adapted to be rocked by said guide upon the occurrence of an abnormal tension on the thread, means rendered operative by the movement of said lever to actuate the stopping mechanism.

15. A thread-controlled stop motion mechanism, comprising a base, an upright therefrom, a carriage vertically movable on said upright, a plurality of arms extending from said carriage, movable thread-guides mounted on said arms and adapted to render operative the stopping mechanism upon the occurrence of abnormal tension on the thread, a spring for maintaining said carriage in its raised position, and means whereby the carriage may be lowered by the operative within reach for threading.

16. A thread-controlled stop motion mechanism, comprising an upright, a plurality of arms projecting from said upright and downwardly-curved at their ends along which the freed thread slides and is guided, pivoted thread-guides mounted on and near the outer ends of said arms and provided with large wide open mouths for guiding the thread, means rendered operative by the movement of said thread-guides upon the occurrence of abnormal tension on the thread to actuate said stop mechanism and deliver the thread on the downwardly-curved end of its said arm.

17. A thread-controlled stop motion mechanism, comprising a support, an auxiliary actuator lever pivoted on and near the outer end of said support, a crank arm pivoted thereon and provided at its free end with a thread-guide, a link connecting one end of said lever and said crank-arm, and means for yieldingly holding said parts in, and acting to return said parts to, normal position with the crank-arm inclined to the direction of the pull upon the thread passing through said thread-guide.

18. A thread-controlled stop motion mechanism, comprising a support, an auxiliary actuator lever pivoted thereon, a crank arm pivoted on and near the outer end of said support and provided at its free end with a thread-guide, a link connecting one end of said lever and said crank-arm, and means for yieldingly holding said parts in and acting to return said parts to normal position with the crank-arm inclined to the direction of the pull upon the thread passing through said thread-guide.

19. A thread-controlled stop motion mechanism, comprising a support, an auxiliary actuator lever pivoted thereon, a crank arm pivoted thereon and provided at its free end with a thread-guide, a link connecting one end of said lever and said crank arm, a stop on said support, a spring connected with the opposite end of said lever and acting normally to hold the lever against the stop with the crank arm inclined to the direction of the pull upon the thread passing through said thread-guide.

20. A self-contained stop motion mechanism for use in connection with a thread-using machine, comprising a base, a shaft mounted in said base, a driving element for said shaft mounted thereon, a driven element mounted on said shaft, said driven element being adapted to drive said thread-using machine, a clutch for connecting and disconnecting said driven element and said shaft, a cam mounted on said shaft, a pivotally-mounted pawl, positive connections between said cam and pawl whereby the latter is positively and continuously operated, a pivoted notched disk adapted to be engaged by said pawl and connected with said clutch to cause the operation thereof, said pawl being normally held out of engagement with said disk, and means rendered operative by or through the occurrence of a fault in the thread to cause the operation of said disk by said pawl and thus actuate the clutch.

21. A self-contained stop motion mechanism for use in connection with a thread-using machine, comprising a base, a driving element and a driven element mounted on said base, the said driven element being adapted to drive said thread-using machine, clutching means for connecting and disconnecting said driving and driven elements, means for causing the disconnecting of said clutching means, a thread supply mounted on said base, a thread-guiding device mounted on said base and acting by or through the breaking of the thread to render operative said means, and means whereby the distance between said thread supply and said thread-guiding device may be adjusted.

In testimony whereof, I have signed my name to this specification, in the presence of two subscribing witnesses.

CHAS. H. WHITCHER.

Witnesses:
JOHN C. EDWARDS,
THOMAS J. DRUMMOND.